Patented Dec. 15, 1942

2,304,792

UNITED STATES PATENT OFFICE 2,304,792

PREPARATION OF HIGH VISCOSITY MIXED FATTY ACID ESTERS OF CELLULOSE

Loring W. Blanchard, Jr., Rochester, N. Y., assignor to Eastman Kodak Company, Rochester, N. Y., a corporation of New Jersey No Drawing. Application January 25, 1940, Serial No. 315,619

7 Claims. (Cl. 260—225)

This invention relates to the preparation of high viscosity cellulose acetate propionate or cellulose acetate butyrate with an esterification bath, at least 60% of the total acyl content of which consists of propionyl and/or butyryl, in which 3/4–3 parts of fatty acid and 5–7 parts of total liquid are present for each part of cellulose.

This application is a continuation-in-part of my application Serial No. 180,602 filed December 18, 1937, as to all common subject matter found therein. In that application I pointed out that by reducing the liquid ratio and the ratio of fatty acid, the effectiveness of the propionic anhydride (or butyric anhydride) is increased so that the reaction time in making high viscosity esters of high propionyl and butyryl content is shortened at least one third. I have found that by decreasing the ratio of liquid to cellulose and the ratio of fatty acid to cellulose still more and decreasing the proportion of sulfuric acid that the reaction goes smoothly, and that the reaction time is shorter than has been possible with the older methods in which the propionic or butyric anhydride is considerably diluted. I have also found that the reaction goes well with the reduced proportion of sulfuric acid and, a high viscosity ester may be obtained by cooling the anhydride before the esterification proper. I have found that by my process a product is obtained which is easily stabilized due at least partly to the use of a small percentage of sulfuric acid catalyst in the reaction.

An esterification in accordance with my invention involves (1) Pretreatment of the cellulose to be esterified with a pretreatment bath free of catalyst essentially consisting of fatty acid of 2–4 carbon atoms, at least 20–40% of the fatty acid being acetic acid (40% or more being preferred) (2) Cooling of the anhydride to a temperature of not more than 55° F. but above a temperature which would cause solidification of the acetic acid when the anhydride is brought into contact therewith (such as 20–40° F.) the cooling of the anhydride to be effected before the anhydride, the cellulose and the catalyst are brought together. (3) The ratio of liquid to cellulose in the esterification should be at least 5 but less than 7 parts per part of cellulose. (4) The ratio of fatty acid to cellulose in the esterification mixture should be 3/4–3 parts per part of cellulose, preferably less than 3, such as about 2 parts of total fatty acid. (5) The proportion of sulfuric acid, which serves primarily as the catalyst, should be 1–5% but preferably at least 1% and less than 3%, based on the weight of the cellulose. (6) The amount of anhydride used (either propionic or butyric or both) should be greater than theoretical for not only must it completely esterify the cellulose but also it must combine with any moisture present to form the corresponding fatty acid. Therefore although approximately 3 parts of butyric anhydride is the theoretical proportion for esterifying one part of cellulose, nevertheless it is desirable to use approximately 4 parts in the esterification mixture, under ordinary conditions. With propionic anhydride the use of 3.3 parts is desirable under ordinary conditions. On the basis of using cellulose having about 2% of moisture, an excess of anhydride 1/4–1/2 of the theoretical should be employed. If the amount of moisture is greater obviously more anhydride will be required. If the theoretical is figured on the basis of both that necessary for removing moisture and esterifying, but a slight excess over this figure is necessary. (7) The proportion of propionyl and butyryl in the esterification mixture should be at least 60% based on the total acyl. (8) The maximum reaction temperature should be 70°–90° F.

In a process of this kind in which a high propionyl or butyryl should be present in the esterification and yet acetic acid is used in the pretreatment, propionic and/or butyric anhydride will be employed to promote the esterification. As all of the acyl present should be of the esterifying type, the bath should be essentially free of substituted fatty acid compounds.

In carrying out the pretreatment it is only necessary that the cellulose be little more than wet with the pretreatment liquid such as approximately 2 parts of liquid to 1 of cellulose. If desired however the pretreatment may be carried out using a catalyst-free liquid in accordance with the pretreatment method described and claimed in U. S. Patent No. 2,150,690 of Malm to effect swelling of the cellulose fibers. If desired the cellulose may be pretreated with an excess of pretreatment liquid, and after the swelling action it may be pressed or centrifuged to the range of proportion of lower fatty acid for the esterification. In pretreatment processes in which the pretreatment liquid is pressed off or removed by some other means or where a pretreatment in accordance with the Malm patent is used, the pretreatment liquid can consist entirely of acetic acid if desired, providing the cellulose does not contain so much acetic acid that the conditions necessary in accordance with my invention are not possible in the esterification step.

The preferred procedure in esterifying cellulose in accordance with my invention is to pretreat the cellulose with fatty acid and subsequently add a mixture of the anhydride and the catalyst, which mixture has been cooled to below 55° F., thereto, to start the esterification. To assure better control it is desirable that the pretreated cellulose containing fatty acid also be cooled to a temperature above that at which solidification of the acetic acid present occurs. By thus commencing the esterification at a lowered temperature, control of the temperature is facilitated and stopping of the rise in temperature near to the desired maximum is more certain.

It is preferred that the ratio of liquid to cellulose in the esterification be approximately 6:1. A very convenient arrangement is to pretreat the cellulose with 2 parts of pretreatment bath (such as equal parts of acetic and other fatty acids) and then esterify by adding approximately 4 parts of propionic and/or butyric anhydride (preferably that corresponding to the fatty acid used in the pretreatment) and catalyst.

The maximum temperature employed to obtain a high viscosity ester in accordance with my process is 70°–90° F. With the greater amounts of sulfuric acid such as 2.5% or more it is desirable to restrict the maximum temperatures to approximately 80° F. or less although high viscosities may be obtained with a maximum up to 90° F.

In carrying out the process the temperature is allowed to rise to the maximum desired and unless the cellulose has all dissolved (which is not usually the case) the temperature is maintained at approximately that point until dissolving of the fibers does occur.

This viscosities obtained in processes in accordance with my invention are high but it is to be understood that this is to be considered in a relative rather than an absolute sense. For instance with cellulose acetate butyrates (or propionates) having a butyryl (or corresponding propionyl) content in the neighborhood of 50%, viscosities of 100 cps. in a 10% solution in acetone at 25° C. have been uncommon. By my process esters of this type are obtained having a viscosity of 100–200 cps. By my process cellulose acetate butyrates having a butyrl content of approximately 38% and a viscosity of 200–300 cps. may obtained, as will be illustrated by Example I. With esters approaching a propionyl or butyryl content of 20%, cellulose esters having a viscosity of 2,000–4,000 cps. are obtained. These esters are obtained when the proportion of propionyl and butyryl groups (based on total acyl) in the esterification bath is near to 60%. It is to be understood that where fatty acid is referred to herein, the concentrated acid is meant. If anhydride is employed which is not of 100% concentration, the fatty acid therein must be included in calculating the total proportion of fatty acid present in the esterification bath. Various details which are general as to processes of this type may be determined by referenec to my application Serial No. 180,602 and the disclosure of that application as far as applicable should be considered as part of the disclosure of this application.

The following examples illustrate processes in accordance with my invention.

Example I 35 lbs. of cotton linters were treated with a mixture of 35 lbs. of acetic acid and 35 lbs. of butyric acid for 4 hours at 110° F. The mixture was cooled to 50° F., whereupon a mixture of 140 lbs. of buytyric anhydride and 250 cc. of sulfuric acid, which mixture had been cooled down to 25° F. was added. The reaction was allowed to proceed to a maximum temperature of 80° F. in 4 hours. The temperature was maintained at approximately 80° F. for 4 more hours and an extremely viscous, clear dope was obtained.

35 lbs. of water was slowly added to the mixture, which was then kept at 100° F. for 24 hours. The ester was then precipitated, stabilized, washed and dried. It was found to have an acetyl content of 13.3% and a butyryl content of 37.3%.

Example II 3.5 lbs of cotton linters were treated with 7 lbs. of acetic acid for 4 hours at 105° F. 13 lbs. of butyric anhydride was then added and the mass was cooled to 53° F., whereupon a mixture of 1 lb. of butyric anhydride and 31.4 cc. of sulfuric acid was added. The reaction was allowed to proceed to 86° F. and was considered complete at 7½ hours reaction time.

3 lbs. of water mixed with 6 lbs. of acetic acid was added to the mixture, which was then kept at 100° for 18 hours. The ester was precipitated, washed and dried. Analysis indicated that the ester was a cellulose acetate butyrate having an acetyl content of 22.6% and a butyryl content of 26.6%. The ester had a viscosity of 480 cps. in 10% acetone solution.

As pointed out above the anhydride should be cooled before the esterification is started by bringing together the anhydride, the cellulose and the catalyst. The preferred procedure is to cool a mixture of anhydride and catalyst to a temperature less than 55° F. and then add this to the presoaked cellulose wet with the pretreating liquid so as to induce esterification. Another procedure which may be used is to add the anhydride to the presoaked cellulose and lower the temperature thereof to below 55° F. prior to the addition of the sulfuric acid, which is preferably added in solution in propionic or butyric acid.

The ester prepared in accordance with my invention may be separated from the reaction mixture in fully esterified condition preferably after a short treatment to aid its stability or it may be first hydrolyzed. The ester is preferably given a stabilising treatment such as that described and claimed in application Serial No. 254,492 of Malm and Kirton or that described and claimed in application Serial No. 311,601 of H. G. Stone.

The esters made in accordance with my invention are of value for making sheeting for photographic film, laminated glass or wherever a clear, flexible moisture-resistant sheet finds use. These esters are also suitable for molding compositions when mixed with a small percentage of high boiling moisture-resistant plasticizer, such as diamyl phthalate.

Wherever the term "unsubstituted, saturated lower fatty acids and anhydrides" is used herein it is to be understood as referring to acetic, propionic and butyric acids and their anhydrides.

I claim:

1. A process of preparing a high viscosity mixed ester of cellulose which comprises presoaking cellulose with a catalyst-free, activating bath consisting of fatty acid of 2-4 carbon atoms, at least 20% of the bath being acetic acid and then treating the cellulose with an esterifying bath having the following characteristics: (1) at least 60% of the total acyl content is fatty acid groups of 3-4 carbon atoms; (2) there are 5-7 parts of bath per part of cellulose; (3) except for acylation catalyst, the bath consists of unsubstituted saturated lower fatty acid and anhydride; (4) the fatty acid of the bath is at least ¾ and less than 3 parts per part of cellulose; (5) the amount of anhydride, which essentially consists of anhydride of fatty acid of 3-4 carbon atoms, in the bath is above but not greatly in excess of theoretical; (6) the anhydride at the time of forming a mixture of anhydride, catalyst and cellulose has a temperature of less than 55° F. but greater than that which will cause substantial solidification of the acetic acid present; (7) the sulfuric acid catalyst therein is 1-5% (based on the weight of the cellulose); allowing the temperature to rise to a maximum between 70° and 90° F. and maintaining near that maximum until the cellulose is substantially dissolved.

2. A process of preparing a high viscosity mixed ester of cellulose which comprises presoaking cellulose with a catalyst-free, activating bath consisting of fatty acid of 2-4 carbon atoms, at least 40% of the bath being acetic acid and then treating the cellulose with an esterifying bath having the following characteristics: (1) at least 60% of the total acyl content is fatty acid groups of 3-4 carbon atoms; (2) there are 5-7 parts of bath per part of cellulose; (3) except for acylation catalyst, the bath consists of unsubstituted saturated lower fatty acid and anhydride; (4) the fatty acid of the bath is at least ¾ and less than 3 parts per part of cellulose; (5) the amount of anhydride, which essentially consists of anhydride of fatty acid of 3-4 carbon atoms, in the bath is above but not greatly in excess of theoretical; (6) the anhydride at the time of forming a mixture of anhydride, catalyst and cellulose has a temperature of less than 55° F. but greater than that which will cause substantial solidification of the acetic acid present; (7) the sulfuric acid catalyst therein is 1-3% (based on the weight of the cellulose); allowing the temperature to rise to a maximum between 70° and 90° F. and maintaining near that maximum until the cellulose is substantially dissolved.

3. A process of preparing a high viscosity cellulose acetate butyrate which comprises presoaking cellulose with a catalyst-free activating bath consisting of fatty acid of 2-4 carbon atoms, at least 40% of the bath being acetic acid and then treating the cellulose with an esterifying bath having the following characteristics: (1) at least 60% of the total acyl content is butyryl; (2) there are 5-7 parts of bath per part of cellulose; (3) except for acylation catalyst, the bath consists of unsubstituted saturated lower fatty acid and anhydride; (4) the fatty acid of the bath is at least ¾ and less than 3 parts per part of cellulose; (5) the amount of anhydride, which consists of anhydride of fatty acid of 3-4 carbon atoms, in the bath is above but not greatly in excess of theoretical; (6) the anhydride at the time of forming a mixture of anhydride, catalyst and cellulose has a temperature of less than 55° F. but greater than that which will cause substantial the solidification of the acetic acid present; (7) the sulfuric acid catalyst therein is 1-5% (based on the weight of the cellulose); allowing the temperature to rise to a maximum between 70° and 90° F. and maintaining near that maximum until the cellulose is substantially dissolved.

4. A process of preparing a high viscosity mixed ester of cellulose which comprises presoaking cellulose with a catalyst-free activating bath consisting of fatty acid of 2-4 carbon atoms, at least 40% of the bath being acetic acid, at a temperature of 100-130° F., cooling the mass, adding thereto a mixture of anhydride of unsubstituted fatty acid of 3-4 carbon atoms and 1-3% (based on weight of the cellulose) of concentrated sulfuric acid, which mixture has a temperature of less than 55° F. but greater than that which will cause substantial solidification of the acetic acid present in the esterification mixture, the esterifying bath having the following characteristics: (1) at least 60% of the total acyl content is fatty acid groups of 3-4 carbon atoms; (2) there are 5-7 parts of bath per part of cellulose; (3) except for the acylation catalyst, the bath consists of unsubstituted, saturated lower fatty acid and anhydride; (4) the fatty acid of the bath is at least ¾ and less than 3 parts per part of cellulose; (5) the amount of anhydride, which essentially consists of anhydride of fatty acid of 3-4 carbon atoms, in the bath is above but not greatly in excess of theoretical; allowing the temperature to rise to a maximum between 70° and 90° F. and maintaining near that maximum until the cellulose is substantially dissolved.

5. A process of preparing a high viscosity cellulose acetate butyrate which comprises presoaking cellulose with a catalyst-free activating bath consisting of fatty acid of 2-4 carbon atoms, at least 40% of the bath being acetic acid, at a temperature of 100-130° F., cooling the mass, adding thereto a mixture of butyric anhydride and 1-3% (based on the weight of the cellulose) of concentrated sulfuric acid, which mixture has a temperature of less than 55° F. but greater than that which will cause substantial solidification of the acetic acid present in the esterification mixture, the esterifying bath having the following characteristics: (1) at least 60% of the total acyl content is butyryl; (2) there are 5-7 parts of bath per part of cellulose; (3) except for the acylation catalyst, the bath consists of unsubstituted, saturated lower fatty acid and anhydride; (4) the fatty acid of the bath is at least ¾ and less than 3 parts per part of cellulose; (5) the amount of anhydride, which essentially consists of anhydride of fatty acid of 3-4 carbon atoms, in the bath is above but not greatly in excess of theoretical; allowing the temperature to rise to a maximum between 70° and 90° F. and maintaining near that maximum until the cellulose is substantially dissolved.

6. A process of preparing a high viscosity cellulose acetate butyrate which comprises presoaking cellulose with a catalyst-free activating bath consisting of a mixture of 1 part of acetic acid and 1 part of butyric acid per part of cotton at a temperature of 120° F., cooling the mass to 50-55° F., adding thereto a mixture of 4 parts of butyric anhydride and 1-3% (based on the weight of the cellulose) of concentrated sulfuric acid, the mixture having a temperature of 20-30° F., allowing the temperature to rise to a maximum of approximately 80° F. and maintaining at approximately 80° F. until the cellulose is substantially dissolved.

7. A process of preparing a high viscosity mixed ester of cellulose which comprises presoaking cellulose with a catalyst-free activating bath essentially consisting of acetic acid at a temperature of 100–130° F., adding anhydride of fatty acid of 3–4 carbon atoms in an amount in excess of theoretical thereto, cooling the mass to a temperature below 55° F. but not so low as to solidify the acetic acid present, adding 1–5% (based on the weight of the cellulose) of sulfuric acid mixed with a little fatty acid anhydride, so that there is no more than 5–7 parts of esterifying bath per part of cellulose and the acyl of 3–4 carbon atoms constitutes at least 60% of the total acyl present, allowing the temperature to rise to a maximum of 70–90° F. and maintaining near that maximum until the cellulose is substantially dissolved.

LORING W. BLANCHARD, Jr.

CERTIFICATE OF CORRECTION.

Patent No. 2,304,792.  December 15, 1942.

LORING W. BLANCHARD, JR.

It is hereby certified that error appears in the printed specification of the above numbered patent requiring correction as follows: Page 3, first column, line 65, claim 3, after "which" insert --essentially--; line 72, same claim, strike out "the" before "solidification"; and that the said Letters Patent should be read with this correction therein that the same may conform to the record of the case in the Patent Office.

Signed and sealed this 16th day of February, A. D. 1943.

(Seal)

Henry Van Arsdale,
Acting Commissioner of Patents.